US 6,615,930 B2

(12) United States Patent
Bongers-Ambrosius et al.

(10) Patent No.: US 6,615,930 B2
(45) Date of Patent: Sep. 9, 2003

(54) SUCTION MODULE

(75) Inventors: Hans-Werner Bongers-Ambrosius, Munich (DE); Franz Popp, Buchloe (DE); David Hruza, Bad Waldsee (DE); Rory Britz, Kaufering (DE); Ralph Neuhäuser, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/098,836

(22) Filed: Mar. 13, 2002

(65) Prior Publication Data

US 2002/0129949 A1 Sep. 19, 2002

(30) Foreign Application Priority Data

Mar. 14, 2001 (DE) .......................................... 101 12 129

(51) Int. Cl.[7] .............................................. B25D 17/14
(52) U.S. Cl. ...................... 173/198; 173/217; 175/209; 408/58
(58) Field of Search ........................ 173/75, 171, 197, 173/198, 217; 175/209, 211; 51/273; 408/58, 67

(56) References Cited

U.S. PATENT DOCUMENTS

| 1,955,182 | A | * | 4/1934 | Hall .............................. 408/56 |
| 2,246,916 | A | * | 6/1941 | Fischer ......................... 408/56 |
| 2,339,324 | A | * | 1/1944 | Fischer ......................... 408/56 |
| 3,511,322 | A | * | 5/1970 | Bixby et al. .................... 173/75 |
| 3,638,737 | A | * | 2/1972 | Moates ......................... 173/60 |
| 3,850,254 | A | * | 11/1974 | Hirdes ......................... 173/75 |
| 4,036,308 | A | * | 7/1977 | Dellenberg ..................... 173/75 |
| 4,064,952 | A | * | 12/1977 | Lechner ....................... 175/209 |
| 4,192,390 | A | * | 3/1980 | Wanner et al. ................. 173/75 |
| 4,207,953 | A | * | 6/1980 | Reibetanz et al. ........... 175/209 |
| 4,209,069 | A | * | 6/1980 | Smith .......................... 173/75 |
| 5,113,951 | A | * | 5/1992 | Houben et al. ................ 173/75 |
| 5,199,501 | A | | 4/1993 | Kluber et al. |

FOREIGN PATENT DOCUMENTS

| DE | 2534169 | 2/1977 |
| EP | 0434295 | 6/1991 |
| GB | 2090781 | 7/1982 |

* cited by examiner

Primary Examiner—Scott A. Smith
Assistant Examiner—Nathaniel Chukwurah
(74) Attorney, Agent, or Firm—Sidley Austin Brown & Wood, LLP

(57) ABSTRACT

A suction module for an electrical hand-held power too land including a housing (11) at least partially receivable in the battery-receiving chamber (15) of the power tool (1) in the power tool, electrical conductors (9) for connecting the module housing (11) with a power source (10), battery contacts (16) for electrically connecting the module housing with the power tool (1), an aspirator (13) having a drive motor (14) for producing vacuum and located in the module housing (11), with the aspirator (13) being connectable with a suction head (7) arrangeable in a region of a working tool.

10 Claims, 2 Drawing Sheets

SUCTION MODULE

BACKGROUND OF THE INVENTION

1. Field of the Invention

The present invention relates to a suction module for an electrical handheld power tool such as a hammer drill or a chiseling hammer.

2. Description of the Prior Art

A suction module, which is directly mountable on a housing of an electrical hand-held power tool and is connected by a suction hose with a suction head associated with a working tool, and includes a dust collector that is emptied time from time, forms, with the power tool, a compact, easily handable unit that is sufficiently robust for use in constructional industry.

U.S. Pat. No. 5,199,501 discloses a suction module mountable beneath a housing of a hammer drill with which the suction module forms a compact assembly, with the aspirator of the suction module being mounted on a motor shaft of the drill for joint rotation therewith.

British Publication GB-2247852 discloses a suction module mountable beneath a tool housing and including a displaceable suction tube spring-biased along the tool axis and an aspirator having a motor which is connected with an external power supply independently from the power tool motor.

German Publication DE 35 16099 discloses a hammer drill with an outside power source (from a network) with a suction module mounted inside the drill. The suction module includes a spring-biased suction head displaceable along the tool axis and connected with the aspirator by a flexible hose. The aspirator motor is connected with the network via the switch of the power tool motor.

U.S. Pat. No. 5,881,823 discloses a hammer drill with its own power source including a battery module mounted on guide rails and connected with the drill via battery contacts.

An object of the present invention is a suction module for a battery-powered hand-held power tool.

Another object of the present invention is a battery-powered hand-held power tool with a suction module and having a compact structure.

SUMMARY OF THE INVENTION

These and other objects of the present invention, which will become apparent hereinafter, are achieved by providing a suction module for an electrical hand-held power tool and including a housing at least partially receivable in the battery-receiving chamber of the power tool, fastening element(s) for securing the housing in the power tool, electrical conductors for connecting the module housing with a power source, battery contacts for electrically connecting the module housing with the power tool, an aspirator having a drive motor for producing vacuum and located in the module housing, with the aspirator being connectable with a suction head arrangeable in a region of a working tool.

The insertion of the suction module instead of the battery into the battery-receiving chamber of the power tool and connection the module housing, i.e., the suction module with the power source permits to obtain a compact assembly of a network-independent electrical hand-held power tool equipped with a suction module. The remote power source, which is associated with the power tool and is located within the length of the connecting conductors, in form of a battery module, advantageously can be carried on the body of the power tool user, e.g., on a belt. Alternatively, the power source can be formed as an adapter connectable with an electrical network.

Advantageously, the suction module includes a control unit having a timer and electrically connected with the battery contacts and the aspirator motor for effecting advance actuation or slowing down of the suction module dependent from actuation of a switch of a power tool motor and which is provided in a region of a power tool handle. This permits to control the produced vacuum during the power tool operation dependent on a removable material.

Advantageously, the suction module has power source contact elements securable on the module housing and providing for releasable connection of the electrical conductors, which connect the module housing with the power source. This permits to use, as a power source, a belt-carried battery pouch or an electrical network adapter.

Advantageously, the suction module is formed as an element of a kit with matching each other elements complementary to the power tool and a battery module. The battery module can be carried in a belt pouch. Alternatively, instead of a battery module, a network adapter can be used.

Advantageously, the suction module includes a dust collector having a dust collection element and releasably securable beneath the aspirator. The dust collector has its dust inlet side air-tightly connectable with a suction hose connecting the aspirator with the suction head, and having its dust outlet side open toward the aspirator.

The releasable connection of the dust collector permits its emptying or replacement without the need to disconnect the entire suction module from the housing.

Alternatively, a suction unit with a telescopic tube, which is formed as a depth stop and has a dust collector formed as a dust filter catridge such as a filter, can be additionally secured on the power tool. The suction unit forms part of the suction module and is releasably secured to the module housing beneath the aspirator and its motor. The suction unit has its dust outlet side open toward the module housing that forms with the suction unit a compact operational assembly.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
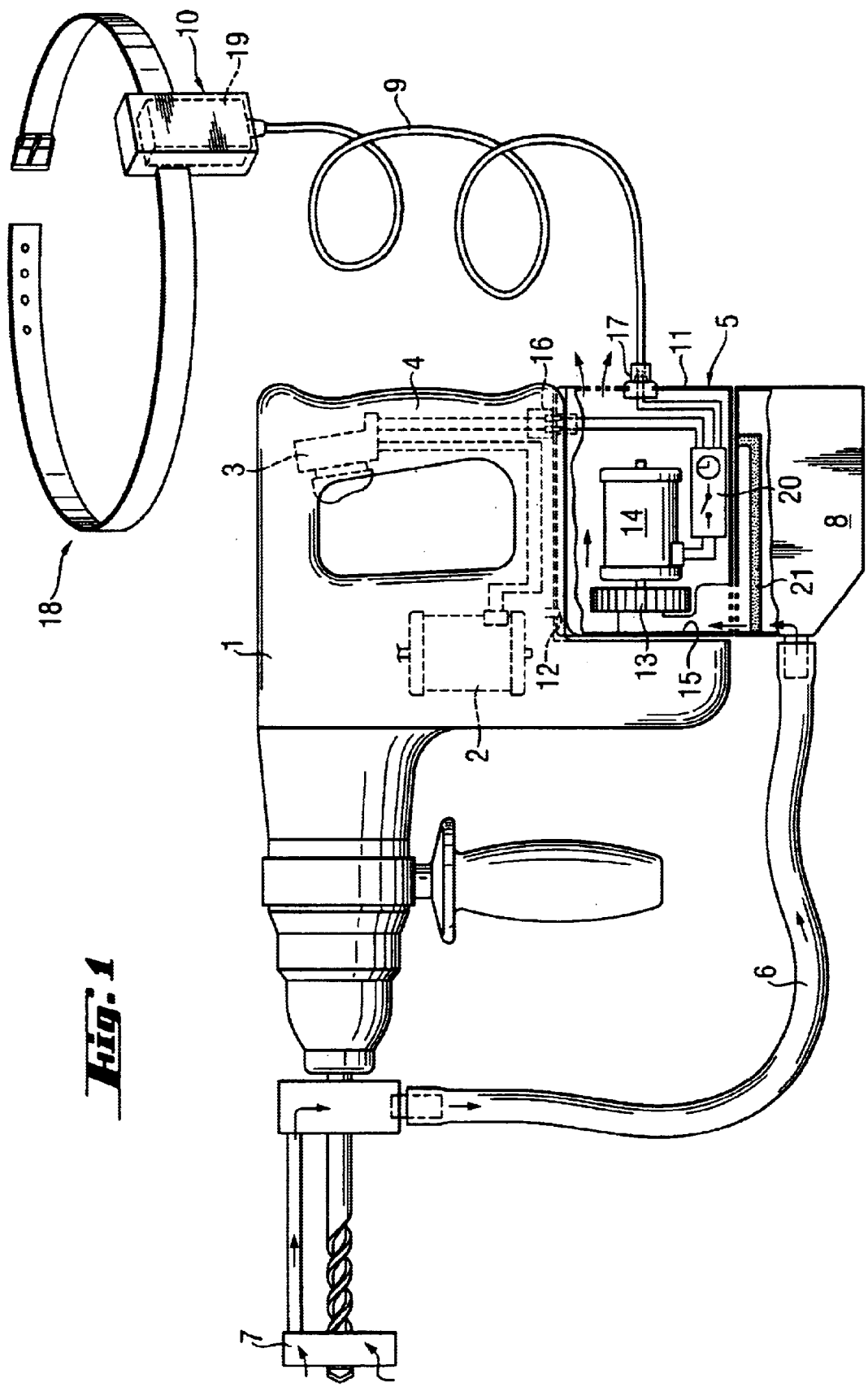
FIG. 1 shows a side, partially cross-sectional view of a drill hammer with a suction module according to the present invention.

An electrical hand-held power tool 1, which is formed as a hammer drill and is shown in FIG. 1, includes an electric motor 2 and a switch 3 provided in the region of the tool handle 4. A suction module 5, which forms together with power tool 1 a compact unit, is connected by a suction hose 6 with a suction head 7 provided in the region of the working tool. The suction module 5 includes a dust collector 8 that is emptied from time to time. Inside the module housing 11 which is connected by electrical conductors with a power source 10, there is arranged an aspirator 13 that is driven by aspirator motor 14 for creating vacuum in the suction head 7. The module housing 11 is mounted within the power tool 1 and is secured therein with dovetail-shaped fastening means 12 which also serves as locking means. The module housing 11 is located, at least partially, in a battery receiving chamber 15 of the power tool 1 and is secured there with the fastening means 12. A battery contact pair 16 electrically connects the module housing 11, via the electric motor switch 3 with the electrical motor 2 of the power tool 1. A power source contact pair 17 electrically connects the module housing 11 with the electrical conductors 9 connected to the power source 10. The power source 10 is formed as a battery module arranged in a pouch secured on a belt 18.

The suction module 5 includes a control unit 20 connected with the aspirator motor 14, battery contact pair 16, and power source contact pair 17. The control unit 20 includes an integrated electrical timer and a power switch. The dust collector 8 is releasably connected with the module housing 11. The dust collector 8 is releasably secured beneath the aspirator 13 and includes dust collection means 21. The dust collector 8 is air-tightly connected, on a side of the dust collection means 21, with the suction hose 6, and is open at its opposite side facing the aspirator 13.

Figure 2:
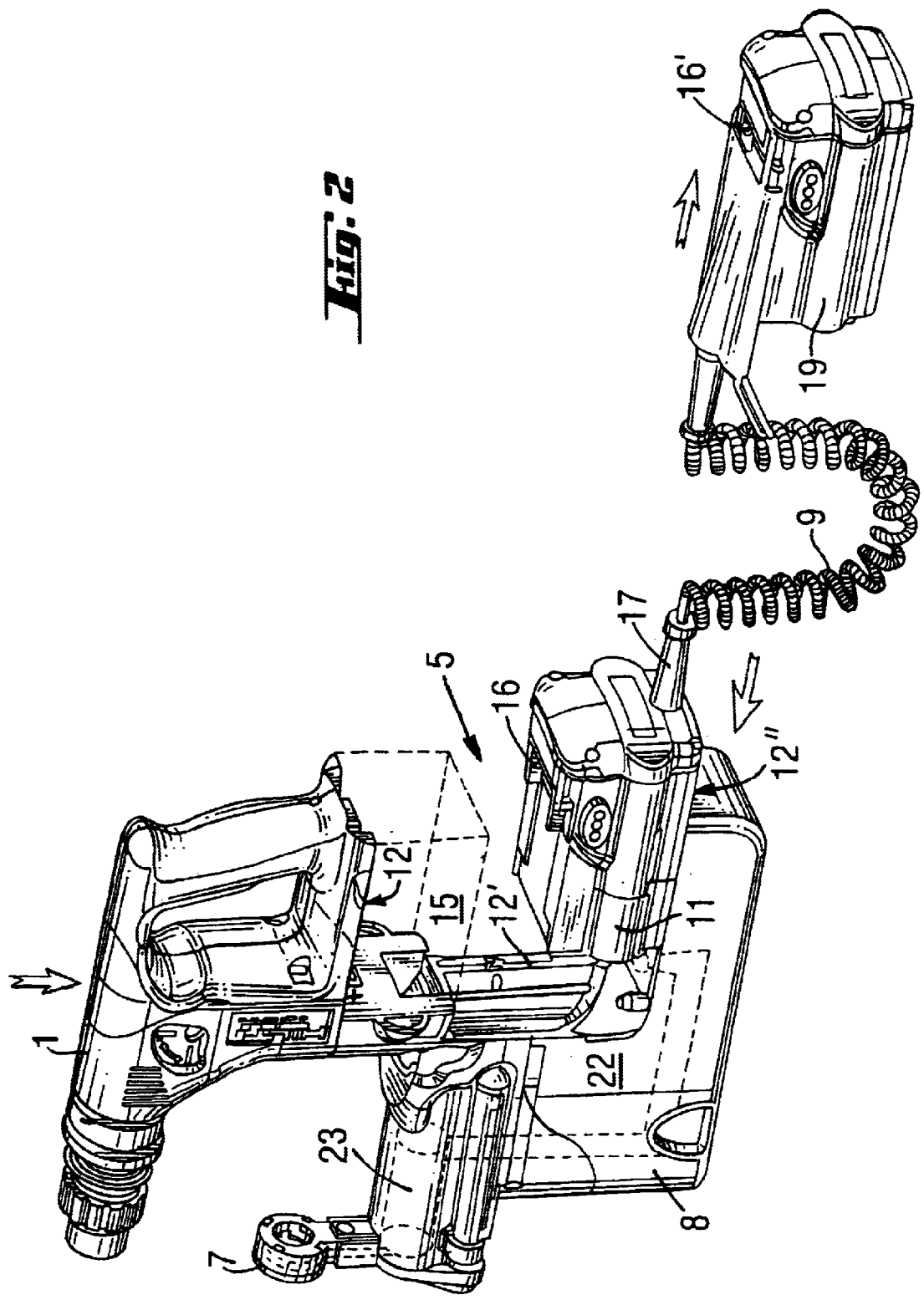
FIG. 2 shows a perspective view of another embodiment of a suction module according to the present invention.

With the embodiment of a suction module 5 shown in FIG. 2, a battery module 19, which is removably received in the battery-receiving chamber 15 of the power tool 1, is electrically connected, via a battery contact pair 16' of an associated adaptor, the conductors 19, and the power source contact pair 17, with the suction module 5.

A battery contact pair 16' connects the battery module 19 with the power tool 1.

A suction unit 22, which is secured on the power tool 1 with dovetail-shaped fastening means 12', is formed with telescopic tube 23 provided with a suction head 7. The telescopic tube 23 is formed as a depth stop. The suction unit 22 also includes a dust collector 8, which is formed as a dust filter catridge and which is open, at its dust exit side, toward the module housing 11. The suction unit 22 forms part of the suction module 5 and is releasably secured in the module housing 11 with dovetail-shaped fastening means 12". The module housing 11 is secured, as it has been mentioned previously, at least partially in the battery-receiving chamber 15 of the power tool 1 with the dovetail-shaped fastening means 12. The suction unit 22 is lockable with the power tool 1 along the fastening means 12'.

Though the present invention was shown and described with references to the preferred embodiments, such are merely illustrative of the present invention and are not to be construed as a limitation thereof, and various modifications to the present invention will be apparent to those skilled in the art. It is, therefore, not intended that the present invention be limited to the disclosed embodiments or details thereof, and the present invention includes all of variations and/or alternative embodiments within the spirit and scope of the present invention as defined by the appended claims.

What is claimed is:

1. A suction module for an electrical hand-held power tool (1) having a battery-receiving chamber (15), the suction module comprising a housing (11) at least partially receivable in the battery-receiving chamber (15) of the power tool (1);

fastening means (12) for securing the housing (11) in the power tool;

an electrical conductor means (9) for connecting the module housing (11) with a power source (10);

battery contact means (16) for electrically connecting the module housing with the power tool (1);

an aspirator (13) having a drive motor (14) for producing vacuum and located in the module housing (11), the aspirator (13) being connectable with a suction head (7) arrangeable in a region of a working tool.

2. A suction module according to claim 1, further comprising a control unit (20) having a timer and electrically connected with the battery contact means (16) and the aspirator motor (14) for effecting at least one of advance actuation and slowing down of the suction module (5) dependent from actuation of a switch (3) of a power tool motor and provided in a region of the power tool handle (4).

3. A suction module according to claim 1, further comprising power source contact means (17) securable on the module housing (11) for releasably connecting the electrical conductor means (9) with the module housing (11).

4. A suction module according to claim 1, wherein the module housing (11) is formed as a part of a kit with matching each other elements complementary to the power tool (1) and a battery module (19) therefor.

5. A suction module according to claim 4, wherein one of the element of the kit is formed as a battery pouch-carrying belt (18).

6. A suction module according to claim 1, further comprising a dust collector (8) having dust collection means (21) and releasably securable beneath the aspirator (13), the dust collector having a dust inlet side thereof air-tightly connectable with a suction hose (6) connecting the aspirator (13) with the suction head (7), and having a dust outlet side thereof open toward the aspirator (13).

7. A suction module according to claim 1, further comprising a suction unit (22) releasably securable on the module housing (11) and having a dust outlet side thereof open toward the module housing (11).

8. A suction module according to claim 7, wherein the suction unit (22) comprises a dust collector formed as a dust filter catridge.

9. A suction module according to claim 7, further comprising means for securing the suction unit (22) on the power tool.

10. A suction module according to claim 1, wherein the suction unit (22) comprises a telescope tube (23).

* * * * *